United States Patent [19]

Gordin

[11] Patent Number: 5,252,869
[45] Date of Patent: Oct. 12, 1993

[54] MEANS AND METHOD FOR COOLING RADIO-CONTROLLED VEHICLE MOTORS

[75] Inventor: Patrick D. Gordin, Oskaloosa, Iowa
[73] Assignee: S & K Racing Products, Inc., Oskaloosa, Iowa
[21] Appl. No.: 849,944
[22] Filed: Mar. 12, 1992
[51] Int. Cl.⁵ .................. H02K 9/00; A63H 30/04; A63H 29/22
[52] U.S. Cl. .................. 310/58; 446/457; 446/456
[58] Field of Search .................. 310/61, 58, 64; 180/68.1, 68.2, 68.3; 446/57, 90, 454, 455, 456, 457, 460, 462, 463, 484, 160-164; 244/53 R, 53 B; 440/38, 88, 900; 114/211

[56] References Cited

U.S. PATENT DOCUMENTS

| | | | |
|---|---|---|---|
| 2,205,605 | 6/1940 | Stewart | 180/68.1 |
| 2,214,723 | 9/1940 | Holland, Jr. | 244/57 |
| 2,352,790 | 7/1944 | Jordan | 244/53 B |
| 2,374,467 | 4/1945 | Sykes | 114/211 |
| 2,573,854 | 11/1951 | Loveloy et al. | 244/57 |
| 3,066,639 | 12/1962 | Kiekhaefer | 440/88 |
| 3,329,377 | 7/1967 | Peterson et al. | 244/53 B |
| 3,524,400 | 8/1970 | Magi | 114/211 |
| 3,779,149 | 12/1973 | Bernard, Jr. | 114/211 |
| 3,871,602 | 3/1975 | Kissinger | 446/57 |
| 3,957,230 | 5/1976 | Boucher et al. | 446/57 |
| 4,235,298 | 11/1980 | Sackett et al. | 180/68.3 |
| 4,249,626 | 2/1981 | Fields et al. | 180/68.1 |
| 4,874,198 | 10/1989 | Roller | 180/68.2 |
| 4,992,071 | 2/1991 | Suto | 310/61 |
| 5,045,013 | 9/1991 | Fujitani | 446/57 |
| 5,086,858 | 2/1992 | Mizuta et al. | 180/68.1 |

FOREIGN PATENT DOCUMENTS

| | | | |
|---|---|---|---|
| 1056949 | 5/1959 | Fed. Rep. of Germany | 180/68.1 |
| 0846567 | 9/1939 | France | 180/68.1 |
| 1139467 | 7/1957 | France | 180/68.1 |
| 2616403 | 12/1988 | France | 180/68.1 |
| 0022694 | 1/1989 | Japan | 114/211 |
| 842218 | 7/1960 | United Kingdom | 114/211 |
| 8806053 | 8/1988 | World Int. Prop. O. | 446/457 |

*Primary Examiner*—Steven L. Stephan
*Assistant Examiner*—C. LaBalle
*Attorney, Agent, or Firm*—Zarley, McKee, Thomte, Voorhees & Sease

[57] ABSTRACT

An apparatus and method cooling the motors for radio-controlled scale model vehicles. Air is received and directed to at least a portion of the motor while the car is moving. The motor is therefore air cooled to reduce the temperature of the motor. The reduced temperature contributes to longer motor and battery life. The apparatus can include an air inlet positioned on or built into the vehicle body with a conduit directed to an air outlet adjacent the motor.

1 Claim, 2 Drawing Sheets

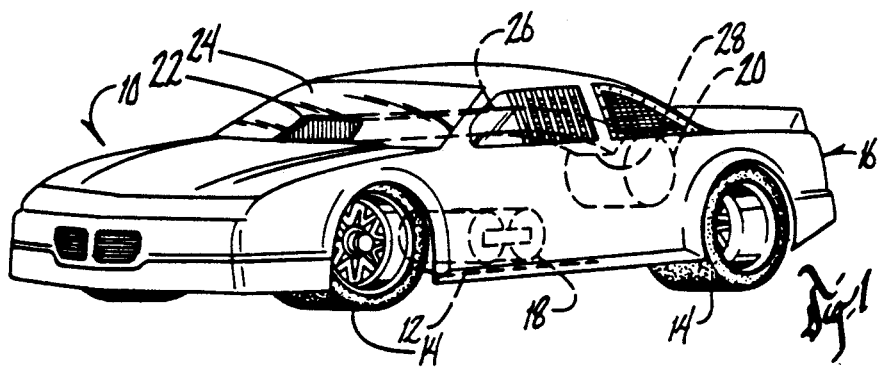
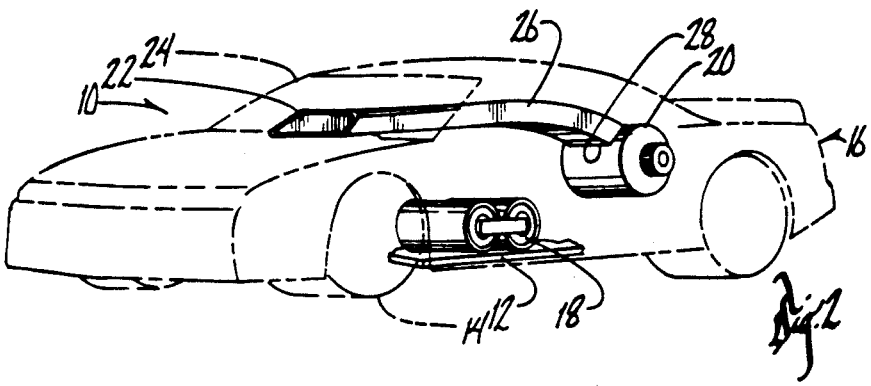
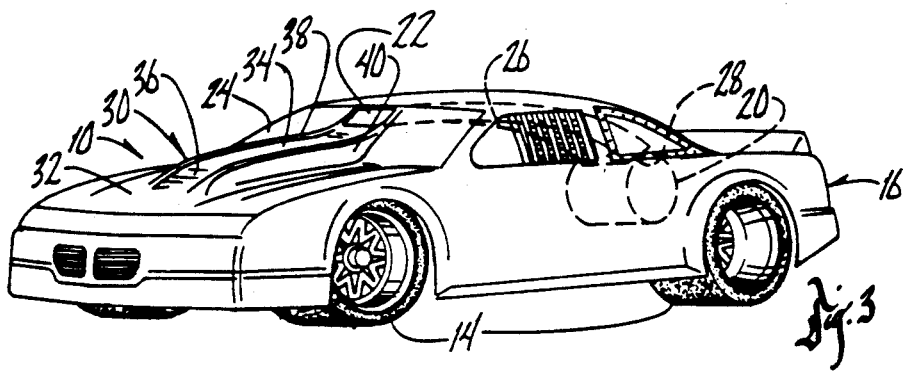
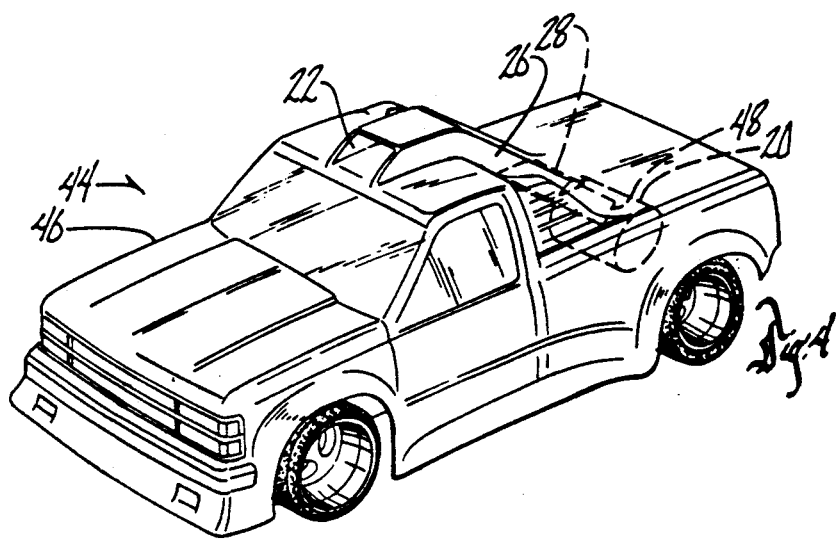

MEANS AND METHOD FOR COOLING RADIO-CONTROLLED VEHICLE MOTORS

BACKGROUND OF THE INVENTION a. Field of the Invention

This invention relates to radio-controlled scale model vehicles, and in particular, to the cooling of the motors used by these vehicles.

b. Problems in the Art

Radio-controlled scale model vehicles are becoming increasingly popular. And currently there is continuing development of these vehicles, including batteries used to power electrical motors used in some of these vehicles and the motors (generally electric, but may be gasoline-powered) used to propel the vehicles.

A particular problem with present vehicles is the heat generated by motor during operation. The motors are generally high RPM motors and as a consequence produce a substantial amount of heat.

A specific example can be given with respect to radio-controlled race cars with electric motors. Motor temperatures can reach levels in the range of 160° to 170° F. or higher. Problems with temperatures in this range are obvious; high motor temperatures reduce motor efficiency and, consequently, performance. Additionally, high operating temperatures lead to more frequent breakdowns and even premature failure.

A somewhat subtle side effect of this high heat is the fact that efficiency of the motors may diminish. For example, it has been found that higher temperatures at the motor can more quickly drain the battery supplying power to the motor. Higher temperatures can also decrease the effective life of the motor. The higher the temperature, the higher the electrical resistance in the wires associated with batteries and electrical motor, and thus more electrical energy is converted to heat; instead of being converted to mechanical energy useful to the motor.

These types of vehicles are scale model (some are one-tenth or one-twelfth scale; other ratios also exists) and relatively small sized. Any of them utilize bodies which are configured to almost identically simulate full size bodies of real vehicles. Many times the motors, and/or batteries, are substantially enclosed within the bodies and frames. This further contributes to the heating problem.

Currently, the conventional method of attempting to reduce heat of this type is to utilize heat sinks on or associated with the motor. The heat sinks attempt to conductively take the heat and dissipate it. While heat sinks can have some beneficial effect, they generally are not able to reduce the heat level as much as would be desirable in many situations.

There is a real need in the art to improve upon the ability to reduce heat generated by these motors. It is therefore a primary object of the present invention to provide a means and method for cooling motors for radio-controlled scale model vehicles which improves over the state of the art.

Another object of the present invention is to provide a means and method as above described which can actually dissipate heat generated by the motor during operation.

Another object of the present invention is to provide a means and method as above described which by cooling the engine or parts of the engine can increase effective operation of the batteries powering the motor and/or the motor for longer periods of time.

Another object of the invention is to provide a means and method as above described which increases the amount of input energy which is converted to mechanical energy to power the car as opposed to thermal energy.

Another object of the present invention is to provide a means and method as above described which minimally impacts upon the stability and aerodynamic characteristics of the vehicle.

Another object of the present invention is to provide a means and method as above described which increases performance of the car.

A still further object of the present invention is to provide a means and method as above described which is non-complex, economical, and efficient.

Another object of the present invention is to provide a means and method as above described which can be adapted for use with a variety of different vehicles and in a variety of different configurations.

Another object of the present invention is to provide a means and method as above described which is durable in the conditions experienced by these vehicles and reduces failures.

These and other objects, features and advantages of the present invention will become more apparent with reference to the accompanying specification and claims.

SUMMARY OF THE INVENTION

The invention pertains to both means and methods for cooling motors for radio-controlled scale model vehicles. The method includes the step of directing air onto at least certain parts of the motor while the vehicle is moving. Such air cooling can be done passively in the sense that no moving parts or complicated structure is needed to accomplish this method.

The means of the invention utilizes an air inlet or opening generally oriented towards the direction of travel of the vehicle. An air outlet is positioned near the motor. An air conduit connects the inlet and outlet so that air is directed onto the motor while the vehicle is moving.

Several options and features are possible with the invention as will be further described later. It can be seen that the invention achieves at least all of its stated objectives.

BRIEF DESCRIPTION OF THE DRAWINGS

FIG. 1 is a perspective view of one embodiment of the invention with respect to a radio-controlled car.

FIG. 2 is an isolated perspective depiction of the invention and its association with the motor and drive train of the car of FIG. 1.

FIG. 3 is a perspective view of an optional alternative embodiment of the invention.

FIG. 4 is a perspective view of a still further optional alternative embodiment of the invention.

DETAILED DESCRIPTION OF THE PREFERRED EMBODIMENT

Figure 5:
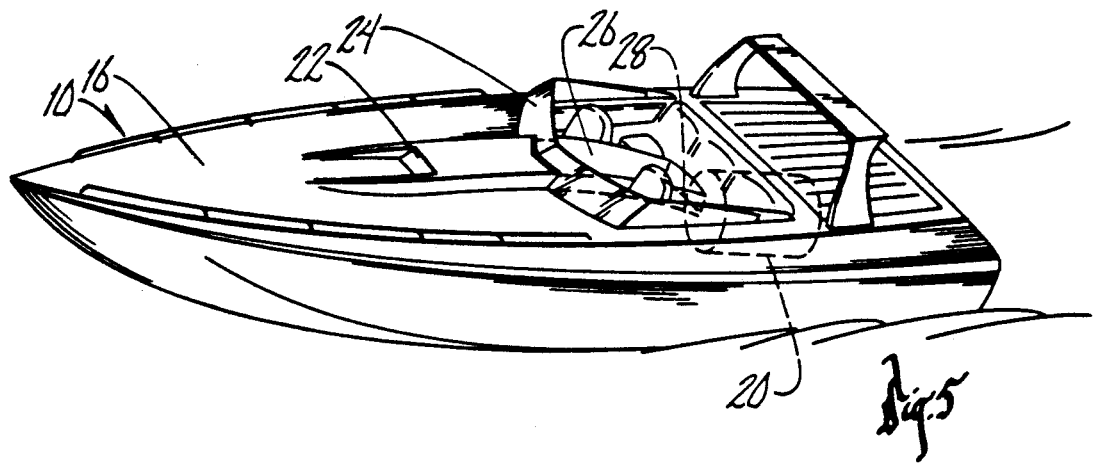
FIG. 5 is a perspective view of yet a further optional alternative embodiment of the invention.
Figure 6:
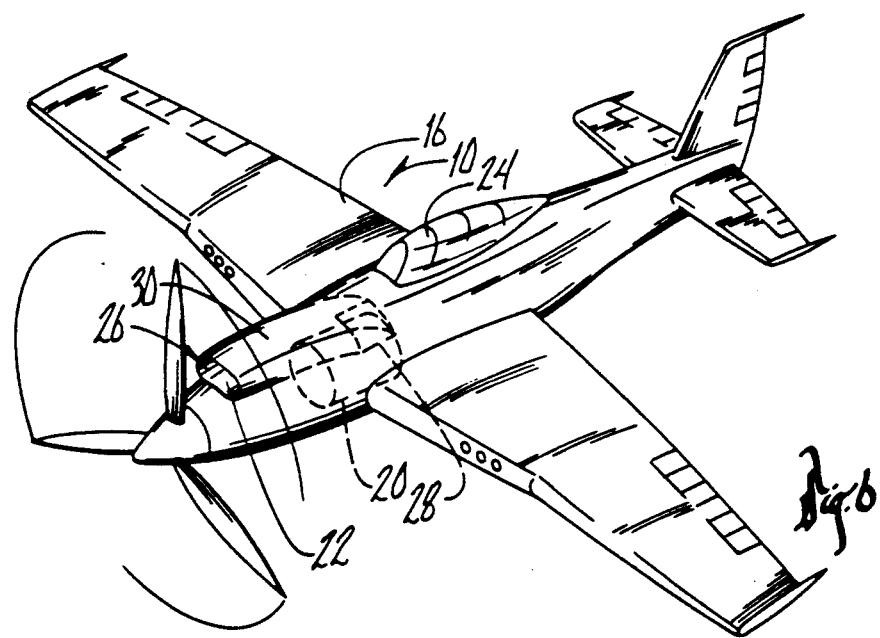
FIG. 6 is a perspective view of a still further optional alternative embodiment of the invention.

To assist in a better understanding of the invention, a preferred embodiment of the invention will now be described in detail. The drawings will be used in this description. Various parts and locations in the drawings are identified with reference numbers. These same reference numbers will be used to identify the same parts and locations in all of the drawings unless otherwise indicated.

OVERVIEW

The preferred embodiment that will be described is an air cooling system for radio-controlled cars or trucks. It is to be understood that the present invention could also be utilized with radio-controlled, scale model water vehicles (such as propeller-driven boats, fan-driven hydroplanes, and the like); or radio-controlled scale model air vehicles such as planes and helicopters. The invention could also be utilized with other types of vehicles such as radio-controlled motorcycles.

The preferred embodiment uses batteries to power an electric motor. It is to be understood that the invention is also applicable to other power/motor combinations. One example is a gasoline powered motor.

With respect to radio-controlled cars or trucks, several different configurations are possible. Examples will be illustrated and discussed below.

FIGS. 1 and 2

FIGS. 1 and 2 illustrate one embodiment the invention could take. Car 10 consists of a frame 12, wheels 14 and body 16. In this embodiment, body 16 is a hollow plastic, one-piece part shaped to simulate a real car.

FIG. 1 shows in ghost lines the general conventional position for batteries 18 and motor 20. These components are positioned on top of frame 12 and are substantially enclosed in body 16. Their interconnection and operation is well known in the art and will not be described in detail. Furthermore, the manner in which the rotary power of motor 20 is transferred through gears to a drive axle for the rear wheels 14 of the vehicle will not be described in detail but is shown schematically in FIG. 2.

FIG. 1 shows an air inlet 22 in windshield 24 of body 16. A plastic tube 26 (in this embodiment rectangular in cross section) extends from air inlet 22 through body 16 back to an air outlet 28 substantially adjacent to motor 20. As car 10 travels during operation, air would enter inlet 22, and would be directed substantially on to motor 20. Body 16 and frame 12 are not completely sealed and therefore the air would be able to exit car 10.

This airflow, however, would basically air cool motor 20. It has been found that in body style such as shown in FIG. 1, that operation temperature of the motor normally being at 160° to 170° F., with or without heat sinks, can be reduced by 40° F. or more with this system.

Still further, it has been found that a car of this type normally would have about 20 seconds left on its battery pack after a 4 minute race. With an air cooling system of this type, in a series of tests it was found that approximately 1 minute and 15 seconds was left on the battery pack for a similar 4 minute race.

FIG. 2 shows more specifically tube 26 and its relationship to motor 20. It has been found that in the embodiment of FIGS. 1 and 2, where air inlet 22 is approximately 1" wide by 6/10" tall (these dimensions can vary, particularly with the scale size of the vehicle), there is little effect on air drag or on the aerodynamic characteristics of the car. In other words, the air drag is not materially increased or decreased. Additionally, if the car was maneuvered through jumps, it did not upset its aerodynamic stability. The car would not nose dive or float, or be upset sideways.

FIGS. 3 and 4

FIGS. 3 and 4 show two alternative configurations for the invention as it relates to radio-controlled car or trucks. A variety of other configurations are, of course, possible.

FIG. 3 is similar to the embodiment of FIGS. 1 and 2 except for the following: An addition 30 is built into hood 32 of car 10. Addition 30 includes a raised portion 34 having a slanted front and sidewalls 38 and 40 on opposite side of raised portion 34. Air inlet 22 would then be positioned at the top and center of windshield 24 at the end of the top of raised portion 34. Addition 30 attempts to channel air between walls 38 and 40, and along raised portion 34 into air inlet 22.

FIG. 3 shows that air conduit 26 could follow right along the inside of the roof of body 16 (as well as along the inside of the rear window). This would allow the roof and window to form one side of the air conduit 26. A three sided insert could then be affixed to the inside of the body, which could be an easier way of constructing air conduit 26.

FIG. 4 shows that the invention could be used substantially externally of the vehicle body. In this embodiment, truck 44 has a model truck body 46. Air inlet 22, air outlet 28, and tube 26 are all similar to those previously described, except that a substantial portion of tube 26, and air inlet 22 are positioned outside of the body and extend through an aperture 48 into the body so that air outlet 28 can be adjacent with motor 20 inside the rear of body 46.

It will be appreciated that the present invention can take many forms and embodiments. The true essence and spirit of this invention are defined in the appended claims, and it is not intended that the embodiment of the invention presented herein should limit the scope thereof.

For example, the exact position of the air inlet and tube can be in many different orientations and configurations. For example, the air inlet could be in the front grill, underneath the front part of the body, along the side of the body, or in other places or orientations. It could also be formed as a part of a raised portion on the body hood to simulate a hood scoop, instead of entering through the windshield. There could also be multiple air inlets which merge into a conduit, or multiple inlets, conduits, and outlets.

Additionally, in the preferred embodiment, tube 26 is basically uniform in diameter along its length. However, it could be necked down or otherwise non-uniform if desired.

Still further, although several different types of vehicles have been mentioned with regard to the preferred embodiment, it should be clearly understood that the invention is applicable to what are called pan cars (having no suspension), off-track vehicles, mobile racing vehicles, and other vehicles whether cars, trucks or other types.

The present invention is applicable also to vehicles having motors not necessarily in the back or rear of the vehicle.

Also, the air conduit and air outlet can be configured to direct air onto specific parts of the motor. For example, air could be concentrated on electric motor brushes, or even on wiring, if desired.

What is claimed is:

1. An apparatus for cooling an electrical motor for radio-controlled, scale-model vehicle having a body shell and a forward-facing portion of the body shell comprising:

a means for receiving air associated with the forward-facing portion of the body shell, the means for receiving air including an aperture in the forward-facing portion of the body shell;

a means for distributing air on or near the motor; and an air conduit means for communicating the means for receiving air with the means for distributing air extending substantially through the body shell;

the body including a hood and a windshield, the means for receiving air being defined by an aperture in the windshield, a raised portion extending forwardly from the aperture in the windshield, and side walls extending above the raised portion on opposite sides of the raised portion.

* * * * *